J. R. TATE & N. J. SMITH.
ANIMAL SHOE REMOVING DEVICE.
APPLICATION FILED DEC. 9, 1916.
1,231,097.
Patented June 26, 1917.
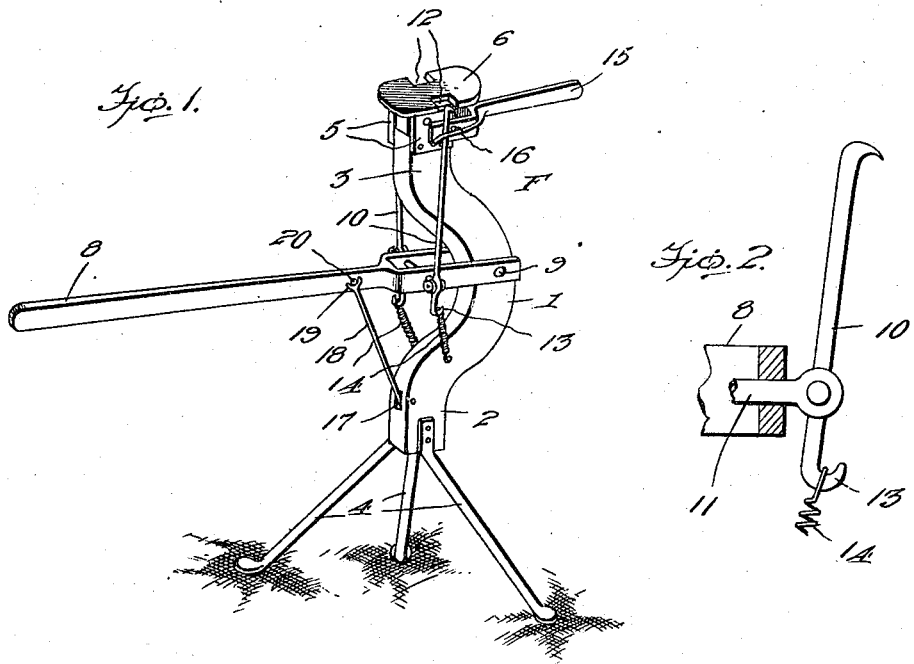
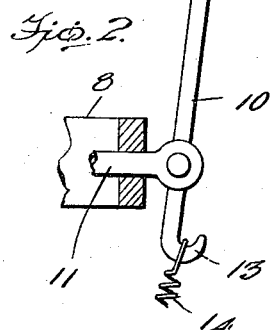
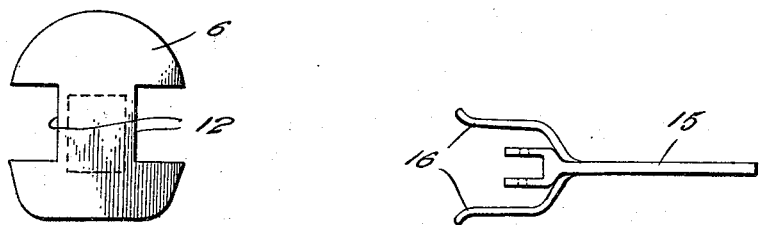
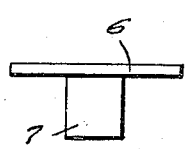
John R. Tate
Newton J. Smith
Inventors
By Geo. P. Kimmel
Attorney

UNITED STATES PATENT OFFICE.

JOHN R. TATE AND NEWTON J. SMITH, OF SENECA, MISSOURI.

ANIMAL-SHOE-REMOVING DEVICE.

1,231,097.   Specification of Letters Patent.   Patented June 26, 1917.

Application filed December 9, 1916. Serial No. 136,011.

*To all whom it may concern:*

Be it known that we, JOHN R. TATE and NEWTON J. SMITH, citizens of the United States, and residents of Seneca, in the county of Newton and State of Missouri, have invented certain new and useful Improvements in Animal-Shoe-Removing Devices, of which the following is a specification.

The present invention relates to the class of farriery and has particular reference to new and useful improvements in a shoe removing stand.

The primary object of our invention is to provide a shoe removing device of the class described which is adapted for quick engagement with the shoe of an animal and to remove the same in one operation.

Another object of our invention is to provide a device of the class described which is adapted to relieve the shoer of the many disadvantages of the devices now in use.

A still further object of our invention resides in the provision of a device of the character described that is simple in construction, efficient in operation, that can be manufactured and placed on the market at a minimum cost.

Other objects as well as the nature, characteristic features and scope of our invention will be more readily understood from the following description taken in connection with the accompanying drawing, and pointed out in the claims forming a part of this specification, in which:

Figure 1 is a perspective view of our animal shoe removing device;

Fig. 2 is a front elevation of one of the hook members with the frame of our device in section;

Fig. 3 is a plan view of the hook retaining means;

Fig. 4 is a top plan view of the hoof supporting plate; and

Fig. 5 is a front elevation of the same showing a lug attached thereto.

Referring more particularly to the drawing, wherein similar characters of reference designate like and corresponding parts throughout the various views, F designates the frame in its entirety of our animal shoe removing device, the frame being looped as at 1 intermediate its ends and provided with a plurality of oppositely extending divergent arms 2 and 3. The supporting means of our frame comprises a plurality of legs 4 riveted or otherwise secured to the lower arm 2.

A pair of strips 5 are secured to the sides of the upper arm 3, the upper edges thereof being adapted to receive a hoof-engaging plate and to retain the same in the desired position. A hoof-engaging plate 6 conforming in shape to that of an animal hoof is provided with a lug 7 thereon and adapted to snugly engage the sides of the strip 5 thus forming means for detachably engaging the strips. It is to be understood that we have provided a plurality of these hoof-engaging plates 6 of various sizes to accommodate and adapt the device to be used with all animals that are to be shod.

A forked lever 8 is pivotally connected to the frame midway of the looped portion 1 by means of a bolt 9. A pair of bars 10 are pivotally connected to a shaft 11 extending transversely of the forked lever and provided with enlarged heads which are recessed to receive the said bars adjacent one of their ends thus forming long and short arms.

Hook members are formed on the free or long ends of the bars 10 extending into recesses 12 formed on the sides of the hoof-engaging plates. The opposite ends of the bars are provided with hooks 13.

A pair of coil springs 14 each have one of their ends secured on opposite sides of the frame and the free ends of the said springs are connected to the hooks 13. A small forked lever 15 is pivotally connected to the strips 5. A pair of oppositely disposed divergent spring arms 16 are formed on the lever 15 for an obvious purpose.

An opening 17 is provided at the base of the frame which is adapted to receive the end of a supporting rod 18 which is pivotally connected to the frame in the said opening. The free end of the rod is provided with a pair of ears 19 forming a groove to receive a lug 20 mounted on the lever 8. In use the free end of the rod 18 is placed in engagement with the lug 20 on the lever 8. The spring arms of the small forked lever 15 engage the pivotally connected bars 10 and retain the same in the recesses 12 formed in the hoof-engaging plates. When the animal's hoof is placed on the plate 6 the lever 15 is raised or lowered thus releasing the hook members which will automatically engage the shoe by means of the springs 14. The rod 18 is then disengaged from the lug on the large forked lever, which is then lowered removing the shoe from the hoof of the animal as desired.

It will be understood that the above description and accompanying drawing comprehend only the general embodiment of our invention and that various minor changes may be made in the detail of construction, proportion, and arrangement of the parts within the scope of the appended claims and without sacrificing any of the advantages of our invention.

Having thus fully described our invention, what we claim as new and desire to secure by Letters Patent, is:—

1. In a device of the class described, including a frame, supporting legs therefor, a plate member conforming in configuration to that of a hoof, and means associated with the said frame for engaging the shoe of an animal for removing the same.

2. In a device of the class described, including a frame, supporting means therefor, a plurality of strips mounted on the upper sides of said frame, a plate conforming in shape to that of an animal's hoof for supporting the same, a lug formed on the plate adapted to be seated between said strips, and bars associated with the said frame for engaging the shoe of an animal and to remove the same.

3. In a device of the class described, including a frame bent intermediate its ends to form a looped member having divergent arms, a plurality of legs supporting said frame, a pair of strips mounted on the outer edge of the frame, a plate adapted to receive the hoof of an animal mounted on said strips, the said plate having recesses formed intermediate the sides thereof, a forked lever having the forks thereof pivotally connected to the frame intermediate the sides of the looped frame, a pair of bars pivotally connected to the forked lever adjacent their ends and having hooks formed on the free ends of the said bars, and the said hooks formed on the bars extending into said recesses for a purpose described.

4. In a device of the class described, including a frame looped intermediate the ends thereof, supporting means for the same frame, a hoof-engaging plate detachably connected to the said frame, a forked lever pivotally connected to the looped portion of the frame, a pair of bars pivotally connected to the said forked lever having hooks formed on all their ends, the hooks on the upper ends being adapted for engagement with the shoe of an animal, and means associated with the said frame connected with the lower hooks for retaining said shoe engaging hooks in engagement with the shoe of an animal when desired.

In testimony whereof, we affix our signatures hereto.

JOHN R. TATE.
NEWTON J. SMITH.

Copies of this patent may be obtained for five cents each, by addressing the "Commissioner of Patents, Washington, D. C."